(12) United States Patent
Hui et al.

(10) Patent No.: US 9,068,448 B2
(45) Date of Patent: *Jun. 30, 2015

(54) SYSTEM AND METHOD FOR PREDICTING FLUID FLOW CHARACTERISTICS WITHIN FRACTURED SUBSURFACE RESERVOIRS

(75) Inventors: Mun-Hong Hui, Oakland, CA (US); Bradley Thomas Mallison, Mountain View, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 624 days.

This patent is subject to a terminal disclaimer.

(21) Appl. No.: 12/630,709

(22) Filed: Dec. 3, 2009

(65) Prior Publication Data

US 2010/0138196 A1 Jun. 3, 2010

Related U.S. Application Data

(60) Provisional application No. 61/119,615, filed on Dec. 3, 2008, provisional application No. 61/119,604, filed on Dec. 3, 2008.

(51) Int. Cl.
*G06G 7/48* (2006.01)
*E21B 43/26* (2006.01)
(Continued)

(52) U.S. Cl.
CPC .............. *E21B 43/26* (2013.01); *E21B 43/00* (2013.01); *E21B 49/00* (2013.01); *G06F 17/5018* (2013.01); *G06F 2217/16* (2013.01)

(58) Field of Classification Search
CPC ....... E21B 43/26; E21B 43/261; E21B 43/00; E21B 49/00; G01V 2210/64; G01V 2210/645; G01V 2210/66; G01V 2210/665; G01V 2210/646; G01V 1/00; G01V 1/28; G01V 1/282; G01V 1/301; G01V 1/302; G01V 1/30; G01V 1/308; G06F 17/5018; G06F 2217/16
USPC ................................. 703/10, 9; 702/6, 11, 14
See application file for complete search history.

(56) References Cited

U.S. PATENT DOCUMENTS 5,740,342 A 4/1998 Kocberber
6,106,561 A * 8/2000 Farmer ........................... 703/10
(Continued)

FOREIGN PATENT DOCUMENTS

CN 102750725 A 10/2012

OTHER PUBLICATIONS

Karimi-Fard Et al. "Generation of Coarse-scale continuum flow models from detailed fracture characterization"., Water Resources Research, vol. 42, 2006. 13 pages.*
(Continued)

*Primary Examiner* — Eunhee Kim (57) ABSTRACT

A system and method having application notably towards predicting fluid flow characteristics within fractured subsurface reservoirs. The system and method include steps of reservoir characterization, gridding, discretization, and simulation of geologically realistic models describing the fractured subsurface reservoirs. A stochastic fracture representation that explicitly represents a network of fractures within a subsurface reservoir is constructed and used to build a fine-scale geological model. The model is then gridded such that the network of fractures is represented by interfaces between the fine-scale cells. The model is the discretized and simulated. Simulation can be on a fine-scale or on an upscaled coarse-scale to produce efficient and reliable prediction of fluid flow characteristics within the subsurface reservoir.

31 Claims, 9 Drawing Sheets

(51) Int. Cl.
E21B 43/00 (2006.01)
E21B 49/00 (2006.01)
G06F 17/50 (2006.01)

(56) References Cited

U.S. PATENT DOCUMENTS

| | | | |
|---|---|---|---|
| 6,266,062 B1 | 7/2001 | Rivara | |
| 6,490,526 B2 | 12/2002 | Matteucci et al. | |
| 6,826,520 B1 * | 11/2004 | Khan et al. | 703/10 |
| 6,842,725 B1 | 1/2005 | Sarda | |
| 6,907,392 B2 * | 6/2005 | Bennis et al. | 703/10 |
| 6,922,662 B2 | 7/2005 | Manceau et al. | |
| 7,047,165 B2 | 5/2006 | Balaven et al. | |
| 7,260,508 B2 | 8/2007 | Lim et al. | |
| 7,369,973 B2 | 5/2008 | Kennon et al. | |
| 7,451,066 B2 | 11/2008 | Edwards et al. | |
| 7,561,991 B2 | 7/2009 | Matsunaga et al. | |
| 7,565,278 B2 | 7/2009 | Li et al. | |
| 7,634,395 B2 | 12/2009 | Flandrin et al. | |
| 8,274,859 B2 | 9/2012 | Maucec et al. | |
| 2002/0038201 A1 | 3/2002 | Balaven et al. | |
| 2003/0216898 A1 * | 11/2003 | Basquet et al. | 703/10 |
| 2005/0273303 A1 | 12/2005 | Flandrin et al. | |
| 2007/0073527 A1 | 3/2007 | Flandrin et al. | |
| 2008/0133186 A1 | 6/2008 | Li et al. | |
| 2009/0150124 A1 * | 6/2009 | Wilt et al. | 703/10 |
| 2010/0138202 A1 | 6/2010 | Mallison et al. | |
| 2011/0082676 A1 | 4/2011 | Bratvedt et al. | |

OTHER PUBLICATIONS

Lunati et al., "Multiscale finite-volume method for density-driven flow in porous media," 2008, Computational Geosciences, vol. 12, No. 3, pp. 337-350.
Accary et al., "A 3D finite volume method for the prediction of a supercritical fluid buoyant flow in a differentially heated cavity," Dec. 2006, Computers & Fluids, vol. 35. Issue 1, pp. 1316-1331.
Karimi-Fard et al., "An efficient discrete-fracture model applicable for general-purpose reservoir simulators", Jun. 2004, SPE Journal, pp. 227-236.
Masoud Nikravesh, "Soft computing-based computational intelligent for reservoir characterization," 2004, Expert Systems with Applications, vol. 26, pp. 19-38.
International Search Report and Written Opinion for International Application No. PCT/US/2009/066638 dated Jul. 26, 2010, 9 pages.
Teran, J., Molino, N. and Fedkiw, R., Bridson, R., "Adaptive physics based on tetrahedral mesh generation using level sets," Engineering with Computers, vol. 21, Issue 1 (Jul. 2005), pp. 2-18.
Hui, M., Kamath, J., Narr, W., Gong B., and Fitzmorris, R, "Realistic modeling of fracture networks in a giant carbonate reservoir." Paper IPTC 11386, presented at the International Petroleum Technology Conference, Dubai, United Arab Emirates, Dec. 4-6, 2007.
International Preliminary Report on Patentability/Written Opinion of the International Searching Authority, PCT/US2009/066638, Jun. 16, 2011.
Non-Final Office Action dated Jun. 7, 2012, U.S. Appl. No. 12/630,734, filed Dec. 3, 2009, Conf. No. 1312, pp. 1-7.
Final Office Action dated Mar. 26, 2013, U.S. Appl. No. 12/630,734, filed Dec. 3, 2009, Conf. No. 1312, pp. 1-10.
Non-Final Office Action dated Sep. 11, 2013, U.S. Appl. No. 12/630,734, filed Dec. 3, 2009, Conf. No. 1312, pp. 1-9.
Cao, H., et al.; "Parallel Scalable Unstructured CPR-Type Linear Solver for Reservoir Simulation"; SPE 96809, Oct. 2005, pp. 1-8.
Geiger, S., et al.; "Black-Oil Simulations for Three-Component, Three-Phase Flow in Fractured Porous Media"; SPE Journal, Jun. 2009, pp. 338-354.
Helf, Clemons; "A Polygonal / Polyhedral Grid Data Structure for Integrated Grid Generation and Flow Stimulation"; Proceedings of the 17$^{th}$ GAMM-Seminar Leipzig, 2001, pp. 55-67.
Holm, Randi, et al.; "Meshing of Domains with Complex Internal Geometries"; Numerical Linear Algebra with Applications, 2006, vol. 13, pp. 717-731.
Hoteit, et al.; "Multicomponent Fluid Flow by Discontinuous Galerkin and Mixed Methods in Unfractured and Fractured Media"; Water Resources Research, 2005, vol. 41, W11412, pp. 1-15.
Hui, Mun-Hong, et al.; "An Innovative Workflow to Model Fractures in a Giant Carbonate Reservoir"; IPTC 12572, Dec. 2008, pp. 1-15.
Karimi-Fard, M., et al.; "An Efficient Discrete Fracture Model Applicable for General-Purpose Reservoir Simulators;" SPE 79699, Feb. 2003, pp. 1-11.
Kazemi, H., et al.; "Numerical Simulation of Water-Oil Flow in Naturally Fractured Reservoirs"; SPE 5719, Dec. 1976, pp. 317-326.
Li, Liyong, et al.; "Efficient Field-Scale Simulation of Black Oil in a Naturally Fractured Reservoir Through Discrete Fracture Networks and Homogenized Media"; SPE Reservoir Evaluation & Engineering, Aug. 2008, pp. 750-758.
Lim, Kok-Thye, et al.; "A Next-Generation Reservoir Simulator as an Enabling Technology for a Complex Discrete Fracture Modeling Workflow"; SPE 124980, 2009, pp. 1-8.
Mäkel, G.H.; "The Modelling of Fractured Reservoirs: Constraints and Potential for Fracture Network Geometry and Hydraulics Analysis;" Geological Society, London, Special Publications 2007, vol. 292, pp. 375-403.
Mallison, Brad, et al.; "Practical Gridding Algorithms for Discrete Fracture Modeling Workflows"; ECMOR XII—12th European Conference on the Mathematics of Oil Recovery, Sep. 2010, Oxford, UK.
Matthai, S.K., et al.; "Control-vol. Finite-Element Two-Phase Flow Experiments with Fractured Rock Represented by Unstructured 3D Hyrbid Meshes"; SPE 93341, 2005, pp. 1-21.
Hui, Mun-Hong, et al.; "Development and Application of New Computational Procedures for Modeling Miscible Gas Injection in Fractured Reservoirs"; SPE 109686, 2007, pp. 1-11.
Hui, Mun-Hong, et al.; "Realistic Modeling of Fracture Networks in a Giant Carbonate Reservoir"; IPTC 11386, 2007, pp. 11.
Mallison, Brad, et al.; "Practical Gridding Algorithms for Discrete Fracture Modeling Workflows"; PowerPoint Presentation, Sep. 8, 2010.
Mallison, Brad, et al.; "Simple Grid Generation Algorithms for Discrete Fracture Modeling Workflows"; PowerPoint Presentation, Mar. 23, 2011.
Moinfar, Ali, et al.; "Comparison of Discrete-Fracture and Dual-Permeability Models for Multiphase Flow in Naturally Fractured Reservoirs"; SPE 142295, 2011, pp. 1-17.
Persson, Per-Olof, et al.; "A Simple Mesh Generator in MATLAB"; Society for Industrial and Applied Mathematics, 2004, vol. 46, No. 2, pp. 329-345.
Shewchuk, Jonathan Richard; "Constrained Delaunay Tetrahedralizations and Provably Good Boundary Recovery"; University of California Berkeley, Berkeley, CA, 2002.
Shewchuk, Jonathan Richard; "Triangle: Engineering a 2D Quality Mesh Generator and Delaunay Triangulator"; 1996, pp. 1-10.
Si, Hang; "TetGen A Quality Tetrahedral Mesh Generator and Three-Dimensional Delaunay Triangulator"; Version 1.3, User's Manual, Jun. 20, 2005, pp. 1-61.
Warren, J.E., et al.; "The Behavior of Naturally Fractured Reservoirs", SPE 426, Sep. 1963, pp. 245-255.

* cited by examiner

FIG. 9B Averaged DFM map

FIG. 9A MSR map

SYSTEM AND METHOD FOR PREDICTING FLUID FLOW CHARACTERISTICS WITHIN FRACTURED SUBSURFACE RESERVOIRS

CROSS-REFERENCE TO RELATED APPLICATION

The present application for patent claims the benefit of U.S. Provisional Application Patent Ser. Nos. 61/119,604 and 61/119,615, both filed on Dec. 3, 2008, which the entirety of both applications are incorporated herein by reference.

FIELD OF THE INVENTION

The present invention generally relates to a system and method for predicting fluid flow characteristics within subsurface reservoirs, and more particularly, to a system and method for predicting fluid flow characteristics within fractured subsurface reservoirs.

BACKGROUND OF THE INVENTION

The field of hydrocarbon production is directed to retrieving hydrocarbons that are trapped in subsurface reservoirs. Typically, these reservoirs are comprised of parallel layers of rock and fluid material each characterized by different sedimentological and fluid properties. Hydrocarbons accumulate below or between non-porous or lower permeability rock layers, forming reservoirs. These hydrocarbons can be recovered by drilling wells into the reservoirs. Accordingly, hydrocarbons are able to flow from the reservoirs into the well and up to the surface. The production rate at which hydrocarbons flow into the well is vital to the petroleum industry and as a result, a large amount of effort has been dedicated to developing reservoir simulation techniques in order to better predict fluid flow characteristics within subsurface reservoirs.

Highly complex geological subsurface reservoirs, such as reservoirs having a network of fractures, present unique and specialized challenges with regards to forecasting fluid flow characteristics. As discussed later in more detail herein, these challenges arise due to characterization, gridding, discretization, and simulation of the network of fractures within a reservoir.

Subsurface reservoirs with a network of fractures typically have a low permeability rock matrix, making it difficult for hydrocarbons to pass through the formation. Fractures can be described as open cracks or voids within the formation and can either be naturally occurring or artificially generated from a wellbore. The presence of fractures can therefore, play an important role in allowing fluids to flow through the formation to reach a well. For example, hydrocarbon production rates from a well tend to be very different depending on whether the well is intersected by a large fracture. Sometimes fluids such as water, chemicals, gas, or a combination thereof, are injected into the reservoir to help increase hydrocarbon flow to the production well. In situations in which a fracture provides for direct connectivity between a production well and a fluid injection well, the injected fluids can flow through the fracture and bypass the majority of hydrocarbons within the formation that the injected fluids were supposed to help produce.

The positioning of wells in a fractured reservoir becomes increasingly important as wells can be drilled into highly fractured areas to maximize the production rate. Thus, it is desirable to characterize the extent and orientation of fractures in hydrocarbon reservoirs to optimize the location of wells and properly forecast fluid flow characteristics through the subsurface formation. However, realistic geological characterizations of the reservoir are generally too computationally expensive for direct flow simulation of full-field simulation models because current reservoir simulators are encumbered by the level of detail contained in realistic geological characterizations. In particular, these simulations are hindered due to the presence of large models and the high contrast in matrix and fracture permeabilities. This can further be compounded by multiphase flow (oil, gas, solvent, and water), the need to use hydrocarbon pseudo phases to represent first-contact miscible fluids (oil and solvent), the inclusion of complex physics to compensate for gravity and capillarity effects on fluid flow, and complicated producing rules based on actual field development plans.

Various techniques related to the field of reservoir simulation have been explored in efforts to make the simulation of fluid flow within a fractured subsurface reservoir computationally-efficient. These techniques include characterization approaches, gridding techniques, discretization schemes, and simulation methods including upscaling. However, while these attempts may allow for a reduced computational time, they typically are based off of simplifying assumptions that result in less reliable forecasts of the fluid flow characteristics.

SUMMARY OF THE INVENTION

According to an aspect of the present invention, a computer-implemented method is disclosed to predict fluid flow characteristics within a fractured subsurface reservoir. The method includes providing geological data describing a subsurface reservoir having a network of fractures. A stochastic fracture representation that represents the network of fractures is generated. A fine-scale geological model of the subsurface reservoir using the geological data and the stochastic fracture representation is constructed. A fine-scale grid associated with the fine-scale geological model is constructed such that the fine-scale grid defines a plurality of fine-scale cells having cell-to-cell interfaces at boundaries between the polyhedral cells. Cell-to-cell interfaces adjacent to the network of fractures are used to approximate the network of fractures and define fracture connections for the polyhedral cells within the fine-scale grid. The fine-scale grid is discretized to compute fine-scale simulation parameters for the fine-scale cells. Simulation is performed using the fine-scale simulation parameters to predict fluid flow characteristics within the subsurface reservoir.

In one or more embodiments, the fracture connections for the polyhedral cells within the grid include fracture-fracture, fracture-matrix, and matrix-matrix connections.

In one or more embodiments, the fine-scale geological model includes a well. Cell-to-cell interfaces adjacent to the well form an interfaces well region that approximates the geometry of the well and defines well connections within the grid.

In one or more embodiments, the geological data is characterized by seismic images, cores, production logs, downhole well measurements, drilling information, outcrops, and a combination thereof.

In one or more embodiments, the fine-scale grid is generated using adaptive grid refinement.

In one or more embodiments, the fine-scale simulation parameters are computed using a finite-volume discretization.

In one or more embodiments, the fine-scale simulation parameters are characterized by cell volume, cell permeability, cell porosity, cell-to-cell interactions, and a combination thereof. The cell-to-cell interactions are determined by computing transmissibilities for the fracture connections for the polyhedral cells within the fine-scale grid.

In one or more embodiments, the fluid flow characteristics are characterized by pressure distributions, saturation distributions, production rates, or ultimate hydrocarbon recovery.

In one or more embodiments, the fine-scale simulation parameters are simulated by generating a coarse-scale grid defining a plurality of coarse-scale cells, performing upscaling for the coarse-scale grid to compute coarse-scale simulation parameters for the coarse-scale cells based on the fine-scale simulation parameters for the fine-scale cells, and simulating the coarse-scale simulation parameters on the coarse-scale grid. In one or more embodiments, performing upscaling includes performing multiple sub-region upscaling, such that the coarse-scale grid is decomposed into a plurality of sub-regions to account for spatial variability of the fine-scale simulation parameters for the fine-scale cells. In one or more embodiments, performing upscaling includes defining pressure contours within the coarse-scale grid based on the fine-scale simulation parameters for the fine-scale cells, decomposing the coarse-scale grid into sub-regions based on the pressure contours, computing parameters within the sub-regions, computing transmissibilities between the sub-regions within the coarse-scale cells, and computing transmissibilities between the coarse-scale cells. In one or more embodiments, the parameters within the sub-regions are characterized by sub-region bulk volume, porosity, pressure, sub-region-to-sub-region connections, and a combination thereof. The sub-region-to-sub-region connections are determined by defining fracture-fracture connections, matrix-fracture connections, and matrix-matrix connections.

According to an aspect of the present invention, a computer-implemented method is disclosed to predict fluid flow characteristics within a fractured subsurface reservoir. The method includes providing geological data describing a subsurface reservoir having a network of fractures. A fine-scale geological model of the subsurface reservoir is constructed using the geological data. A fine-scale grid associated with the fine-scale geological model is constructed such that the fine-scale grid defines a plurality of polyhedral cells having cell-to-cell interfaces at boundaries between the polyhedral cells. The fine-scale grid is discretized to compute fine-scale simulation parameters for the polyhedral cells and the fine-scale simulation parameters are simulated to predict fluid flow characteristics within the subsurface reservoir. The method additionally includes generating a stochastic fracture representation that represents the network of fractures. The fine-scale grid is constructed such that a plurality of the cell-to-cell interfaces adjacent to the network of fractures represented within the stochastic fracture representation are used to approximate the network of fractures and define fracture connections for the polyhedral cells within the fine-scale grid.

In one or more embodiments, the fine-scale geological model includes a well. Cell-to-cell interfaces adjacent to the well form an interfaces well region that approximates the geometry of the well and defines well connections within the grid.

According to an aspect of the present invention, a system to predict fluid flow characteristics within a fractured subsurface reservoir is disclosed. The system includes a user control interface, a software package, a database, and communication means. The user control interface is used to input information into the system such as geological data describing a fractured subsurface reservoir having a network of fractures. The software package is used to perform various operations. The database is used to store information. The communication means is used to communicate with the software package and output fluid flow characteristics.

The software package can include fracture software, modeling software, gridding software, discretization software, and simulation software. The fracture software is used for generating a stochastic fracture representation that explicitly represents the network of fractures. The modeling software is used for producing a fine-scale geological model representative of the subsurface reservoir using geological data and the stochastic fracture representation. The gridding software is used for constructing a fine-scale grid for the fine-scale geological model such that the fine-scale grid defines a plurality of polyhedral cells having cell-to-cell interfaces at boundaries between the polyhedral cells. Cell-to-cell interfaces adjacent to the network of fractures are used to approximate the network of fractures and define fracture connections for the polyhedral cells within the fine-scale grid. The discretization software is used for discretizing the fine-scale grid to compute fine-scale simulation parameters for the fine-scale cells. The simulation software is used for simulating the fine-scale simulation parameters to predict fluid flow characteristics within the subsurface reservoir.

The database is used to store information including geological data, stochastic fracture representations, fine-scale geological models and parameters, and coarse-scale models and parameters.

In one or more embodiments, the software package includes an upscaling software for generating a coarse-scale grid and performing upscaling for the coarse-scale grid to compute coarse-scale simulation parameters based on the fine-scale simulation parameters.

DETAILED DESCRIPTION OF THE INVENTION

A significant portion of global petroleum resources reside in fractured subsurface reservoirs. In order to optimally extract these hydrocarbon resources, various techniques related to reservoir simulation must be utilized. Aspects of the present invention describe a system and method of utilizing a novel workflow to predict fluid flow characteristics within fractured subsurface reservoirs. In particular, the system and method include steps of reservoir characterization, gridding, discretization, and simulation of geologically realistic models describing such fractured subsurface reservoirs.

Figure 1:
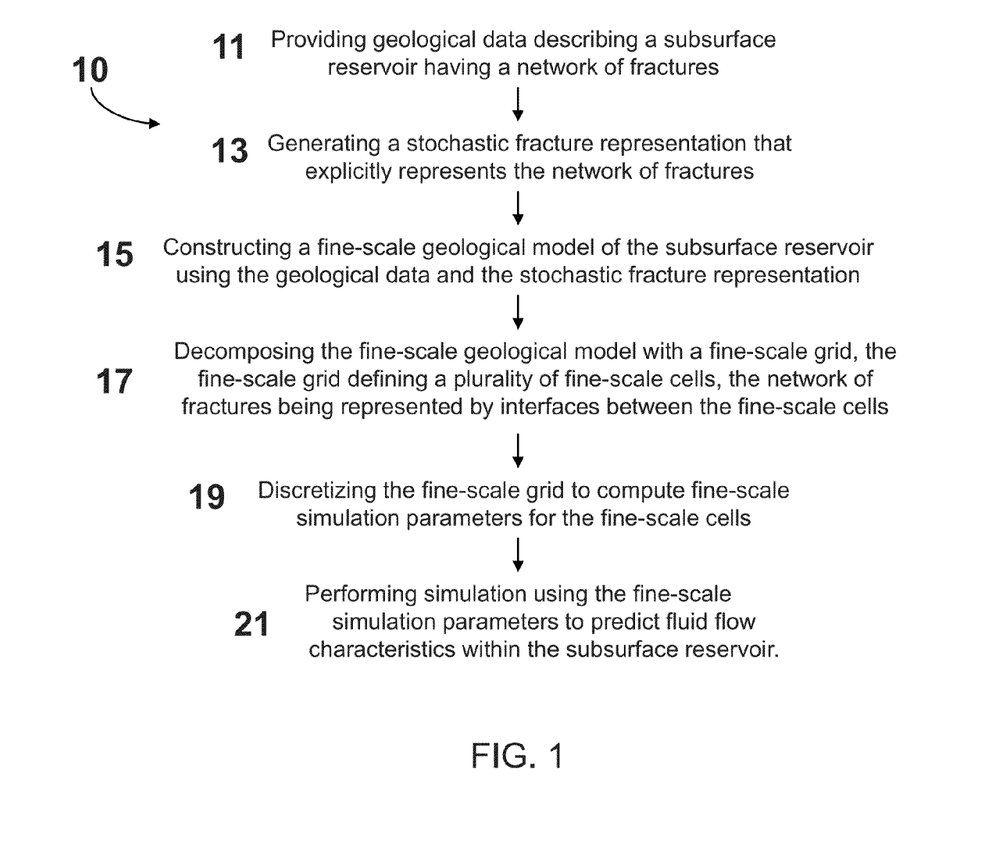
FIG. 1 is a flowchart illustrating steps of a system and method to predict fluid flow characteristics in a fractured subsurface reservoir, in accordance with the present invention.

FIG. 1 illustrates system and method 10 outlining steps, describing aspects of the present invention, in order to predict fluid flow characteristics within fractured subsurface reservoirs. Geological data describing the fractured subsurface reservoir is provided in Step 11. The geological data describing the reservoir can include reservoir information obtained from various sources such as seismic images, cores, production logs, down-hole well measurements, drilling information, and outcrops. A stochastic fracture representation that explicitly represents the network of fractures is generated in Step 13. The geological data and the stochastic fracture representation are used to construct a fine-scale geological model of the subsurface reservoir in Step 15. The fine-scale geological model is decomposed with a fine-scale grid in Step 17. The fine-scale grid defines a plurality of fine-scale cells and the network of fractures is represented by interfaces between the fine-scale cells. In Step 19, the fine-scale grid is discretized to compute fine-scale simulation parameters for the fine-scale cells. Such fine-scale simulation parameters for the fine-scale cells can include cell volume, cell permeability, cell porosity, and cell-to-cell interactions that define fracture-fracture connections, matrix-fracture connections, matrix-matrix connections, as well as, compute respective transmissibilities for each connection. In Step 21, simulation using the fine-scale simulation parameters can be performed to predict fluid flow characteristics within the subsurface reservoir. Simulation can be performed at various resolutions, as will be described later herein. The fluid flow characteristics can include pressure distributions, saturation distributions, production rates, and ultimate hydrocarbon recovery. One skilled in the art will appreciate that fluid flow characteristics for multiple phases such as oil, gas, solvent, and water can be forecasted through such simulation.

The steps of system and method 10 illustrated in FIG. 1, which describe aspects of the present invention in order to predict fluid flow characteristics within fractured subsurface reservoirs, can be further described by discussing various aspects related to the field of reservoir simulation including reservoir characterization, gridding, discretization, and simulation.

Reservoir Characterization

Reservoir characterization can be described as the process of constructing a computer geological model representing a subsurface reservoir based on characteristics related to fluid flow. These computer or geological reservoir models are typically used to simulate the behavior of the fluids within the reservoir under different sets of circumstances to find optimal production techniques. Typically these models comprise a structural and stratigraphic framework populated with rock properties such as permeability distributions and porosity distributions, as well as, fluid properties such as fluid saturation distributions. These properties or parameters describing the geological data of the reservoir can be obtained from various sources including seismic images, cores, production logs, down-hole well measurements, drilling information, and outcrops.

There are many commercially available products for constructing geological reservoir models, such as Earth Decision Suite (powered by GOCAD™) distributed by Paradigm Geotechnology BV headquartered in Amsterdam, The Netherlands and Petrel™ from Schlumberger Limited headquartered in Houston, Tex. One skilled in the art will appreciate that multiple realizations of the same geology can be made, leading to similar, yet different geological reservoir models each being shaped by quasi-random variations. These differences between realizations of geological reservoir models are inherent as only a certain amount of deterministic information can be extracted from the subsurface reservoir, and one typically relies on applying probabilistic methods in combination with the obtained geological data to construct a realistic geological reservoir model.

For fractured subsurface reservoirs, fracture representations, that represent the network of fractures within the reservoirs, can be generated to more accurately predict fluid flow characteristics within the subsurface reservoirs. Generating a fracture representation typically comprises progressing from observations of discrete fractures that intersect wellbores to a field-wide bulk distribution of fractures. For example, data describing the network of fractures can substantially be obtained from image logs and cores. Additional data describing fractures intersecting a particular well can be obtained from sources such as drilling information, production logs, and down-hole well measurements such as a temperature survey. This empirical data can be used to judge whether a particular fracture possesses the size and connectivity to affect fluid flow to a wellbore by a sufficient amount. Once this determination has been made the data can be converted to logs describing fracture density, which is the fracture surface area per unit volume. Artificial neural network techniques can then be employed to generate a spatial distribution of fracture density for the fracture representation. Such techniques are well known by those skilled in the art and allow for distribution of the fracture density using regression analysis based on the data describing the fractures. The fracture density can be rescaled to exactly match the observed distribution of fracture density at the wells and throughout the reservoir by using additional geostatistical techniques. For instance, the neural network results can be re-scaled using Sequential Gaussian Simulation (SGS) collocated co-kriging, a technique well known in the art, wherein the neural network fracture density distribution is used as highly-correlated soft data. The rescaled fracture density distribution can then be used to stochastically generate a fracture representation describing the network of fractures in the reservoir. One skilled in the art will appreciate that the rescaled fracture density distribution can be used as a constraint during the stochastic generation of the fracture representation. Fracture dimensions and orientation data can also be used to constrain the fracture representation.

There are many commercially available products for constructing fracture representations, such as FracMan™ distributed by Golder Associates Inc. headquartered in Atlanta, Ga. The stochastic fracture representation can be imported into a geological reservoir model to construct a more realistic geological characterization of a fractured subsurface reservoir. For example, the set of discrete fractures generated through the fracture-characterization step can be in the form of 2D planar rectangles each consisting of two triangles. These discrete fractures need to be integrated with the matrix portion of the reservoir (represented as grid cells in a structured stratigraphic grid) to form a complete geological reservoir model. These realistic geological reservoir models are typically in the form of highly-resolved discrete fracture models (DFMs) that explicitly define each fracture.

Reservoir Model Gridding

Reservoir model gridding can be described as the process of decomposing a 3D reservoir volume into a plurality of smaller and simpler 3D volumes, which are typically convex 3D volumes. The result breaks a continuous domain into discrete counterparts that can subsequently be used to construct a simulation model by discretizing the governing equations such as those describing fluid flow, heat transfer, geomechanics, or a combination thereof. Therefore, a mesh or grid defining specific discrete volumes is produced. For example, the grid can be a logically Cartesian grid. Within the reservoir simulation community, the discrete volumes are typically referred to as cells, finite volumes, control volumes, or finite elements depending on the discretization and simulation techniques being utilized. The reservoir model can be gridded with various cell sizes and shapes depending on the gridding strategy. The reservoir model is typically gridded at a resolution that can sufficiently capture the fine-scale details of the reservoir model. Such a grid shall be referred to herein as a fine-scale grid.

For realistic discrete fractures models, which are typically at a very high resolution, a fine-scale grid is typically utilized for capturing the details of the network of fractures. However, for fractured subsurface reservoirs, gridding poses a unique challenge due to the geometric complexity and stochastic nature of the network of fractures. For example, one fracture may slightly penetrate the plane of another fracture, two fractures may be close to one another without intersecting, and two fractures may intersect with a small dihedral angle. In general, grids containing internal features must balance the opposing goals of accurately approximating the features and maintaining good quality. If reservoir gridding techniques are not able to accommodate these fine-details while maintaining good grid quality, simulation of the model can result in reduced accuracy, increased run times, convergence problems, or a combination thereof.

One strategy to improve the final grid quality is to preprocess the fracture sets within the fracture representation to remove the most problematic configurations. However, one skilled in the art will recognize that this approach is not straightforward as removal of one problem often creates another. In addition, the implementation is nontrivial due to considerations of floating-point arithmetic in calculating fracture intersections.

To overcome these foregoing problems associated with gridding of a fractured subsurface reservoir, aspects according to the present invention implement a gridding strategy that represents the network of fractures as interfaces between the fine-scale cells and thus, honors the fracture geometry by approximating it with the faces or edges of the fine-scale cells. In this gridding method, grids are composed of polyhedral cells such as hexahedrons, rectangular pyramids, triangular prisms, or tetrahedrons. Discrete fractures are approximated using faces of these cells. Grid resolution is spatially adaptive, and refined cells are used in the vicinity of fractures and wells, while larger polyhedral cells are utilized elsewhere for efficiency. In some embodiments, the grid generation system and method can be adjusted using a single input parameter to obtain a suitable compromise between grid cell quality and the approximation of the fracture representation.

In particular, the cell-to-cell interfaces that are defined at boundaries between the polyhedral cells are selected to approximate the discrete fractures represented within the fractured network. For example, the cell-to-cell interfaces adjacent to the fracture are selected to form a continuous interfaces path that approximates the geometry of the fracture. As used herein, adjacent shall mean lying near or in close proximity to the fracture, and includes both cell-to-cell interfaces adjoining or intersecting the fracture, as well as, those that do not intersect the fracture and are a boundary of a polyhedral cell or neighboring polyhedral cell in which the fracture traverses. Therefore the produced grid, which includes the approximation of the fracture network defined by cell-to-cell interfaces adjacent to the fractures, defines fracture-fracture, fracture-matrix, and matrix-matrix connections amongst the grid cells.

Figure 2A:
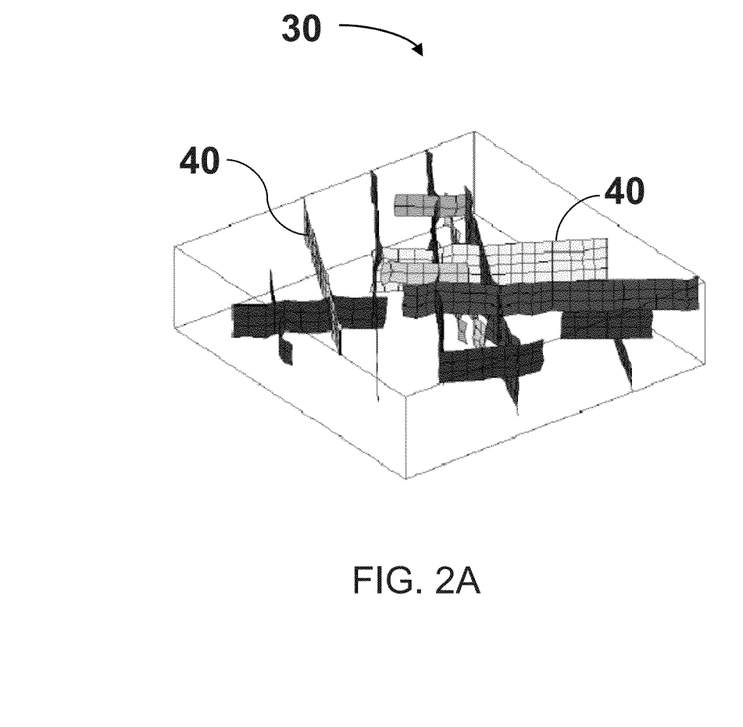
FIGS. 2A and 2B are schematic views illustrating gridding of a domain, in accordance with the present invention.
Figure 2B:
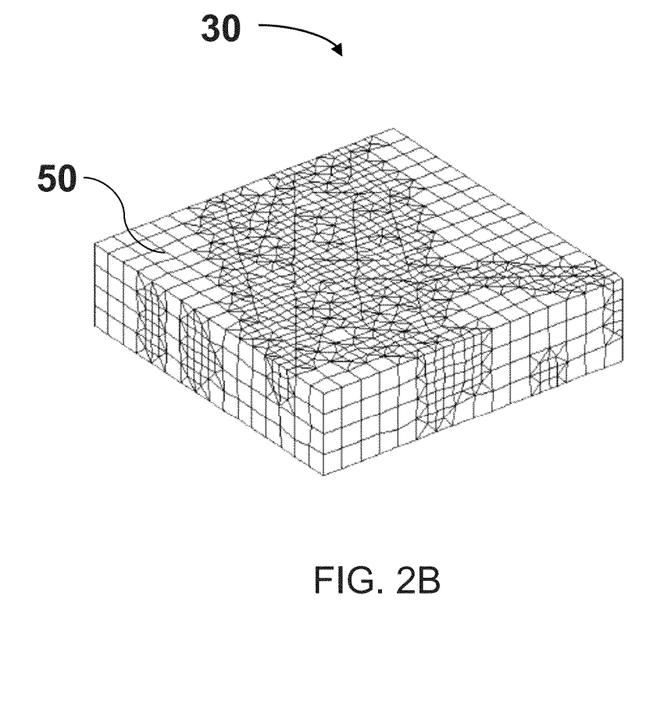

FIG. 2A illustrates an example of a domain 30 containing 16 discrete fractures, represented by 2D polygons, and depicted by reference character 40. FIG. 2B shows the corresponding grid 50 for the domain 30 consisting of approximately 3800 tetrahedrons, 500 prisms, 1000 pyramids, and 2600 hexahedrons. In addition, the fractures are represented using 802 quadrilaterals and 4 triangles.

Reservoir Model Discretization

Discretization is well known in the art and can be described as the process of transferring continuous differential equations describing the geological reservoir model into discrete difference equations suitable for numerical computing. For example, a finite-volume discretization can be applied to compute parameters that can be input into a reservoir simulator.

To be able to perform simulations on the discrete fracture models, a discretization scheme is applied to the fine-scale grid to compute fine-scale simulation parameters. The fine-scale simulation parameters can include cell volume, cell permeability, cell porosity, and cell-to-cell interactions that define fracture-fracture connections, matrix-fracture connections, matrix-matrix connections, as well as, compute respective transmissibilities for each connection. The computed fine-scale simulation parameters can serve as an input to the flow simulation model. One skilled in the art will appreciate that the discretization scheme can include a treatment that eliminates small control volumes, such as those at fracture intersections, for numerical stability in reservoir simulation. The discretization scheme can also include a treatment that avoids the need to resolve the thickness of the fractures.

Reservoir Simulation

Reservoir simulation can be used to predict fluid flow characteristics within the subsurface reservoir once discretization has been completed. In particular, the fluid flow characteristics can include pressure distributions, saturation distributions, production rates, and ultimate hydrocarbon recovery. There are many commercial products used for performing reservoir simulations, such as Chevron's proprietary CHEARS™ simulation package or Schlumberger's ECLIPSE™ reservoir simulator. Additionally, INTERSECT™, which is commonly owned by Chevron and Schlumberger, is another proprietary reservoir simulation package that can be used to simulate fluid flow within a reservoir.

Simulation can be performed at various resolutions, such as at a fine-scale or at a coarse-scale. This decision typically depends on the scale of the problem needed to be simulated, how many simulation runs are required, and the available computing resources. For example, if it is not practical to simulate a full-field discrete fracture model on a fine-scale, the model can be upscaled to reduce the computational time required for simulation.

The upscaling process can be described as coarsening the fine-scale resolution of the fine-scale reservoir simulation model to allow for computational tractability. Therefore, a coarse-scale grid is generated to compute coarse-scale simulation parameters for the coarse-scale cells based on the fine-scale simulation parameters for the fine-scale cells computed during discretization. These coarse-scale simulation parameters, which describe the coarse-scale model, can be simulated to efficiently predict fluid flow characteristics within the subsurface reservoir.

The coarse-scale grid is defined by a plurality of cells, typically of larger size compared to the fine-scale cells. The plurality of fine-scale cells defined by fine-scale grid is greater in number compared to the plurality of coarse-scale cells defined by the coarse-scale grid. Accordingly, the coarse-scale cells can be aggregates of the fine-scale cells. However, one will appreciate that the coarse-scale cells need not be comprised of a particular number of fine-scale cells. Additionally, the coarse-scale cells need not conform to the exterior shape of fine-scale cells such that the faces of the coarse-scale cells can penetrate through the internal geometry of the fine-scale cells. Unlike the fine-scale grid, which is typically gridded so that it can sufficiently capture the fine-scale details of the reservoir model, the coarse-scale grid is typically directed to producing quick computations during simulation.

To perform upscaling of a fine-scale realistic fractured subsurface reservoir model, aspects according to the present invention implement a robust upscaling technique that yields a coarse model that is fast and capable of reasonably reproducing the flow behavior of the discrete fracture model on which it is based. The upscaling procedure comprises performing multiple sub-region upscaling, such that the coarse-scale grid is decomposed into a plurality of sub-regions to account for spatial variability of the fine-scale simulation parameters for the fine-scale cells. Multiple sub-region upscaling includes defining pressure contours within the coarse-scale grid based on the fine-scale simulation parameters for the fine-scale cells, decomposing the coarse-scale grid into sub-regions based on the pressure contours, computing parameters within the sub-regions, computing transmissibilities between the sub-regions within the coarse-scale, and computing transmissibilities between the coarse-scale. The parameters within the sub-regions can include sub-region bulk volume, porosity, pressure and sub-region-to-sub-region connections such as fracture-fracture connections, matrix-fracture connections, and matrix-matrix connections.

Multiple sub-region upscaling can further be described by the steps of first computing a local solution within each coarse cell to determine the sub-region geometry, as well as, intra-cell transmissibilities for flow between the fracture network and the matrix subregions and followed by computing the inter-cell transmissibility linking adjacent cells. The local solutions are computed over the local fine-scale region of the discrete fracture model corresponding to each coarse cell. The upscaled quantities are determined by solving a slightly compressible single-phase flow problem, with injection into the fractures and no-flow boundary conditions along all of the outer faces of the coarse block region. Once the initial transient passes and pseudo steady state conditions are attained, iso-pressure contours are constructed that define the multiple subregions within the matrix portion of the coarse cell. To define the intra-block fracture-matrix and matrix-matrix connections, quantities such as bulk volume, porosity, and pressure are computed for each sub-region. Using the difference in bulk-volume-weighted average pressures and the total volumetric flow rate between adjacent subregions, transmissibility can be calculated. For inter-block flows, a standard two-point transmissibility upscaling procedure can be applied by solving an incompressible single-phase flow problem with standard boundary conditions on two adjacent coarse cells and then dividing the steady-state flow rate by the difference in bulk-volume-weighted average pressures between the cells. The set of multiple sub-region parameters including sub-region bulk volumes, cell porosities, and sub-region-to-subregion transmissibilities define an unstructured coarse-scale flow model of the fractured system that can be used in any connection-list-based reservoir simulator for fast flow simulations.

Figure 3:
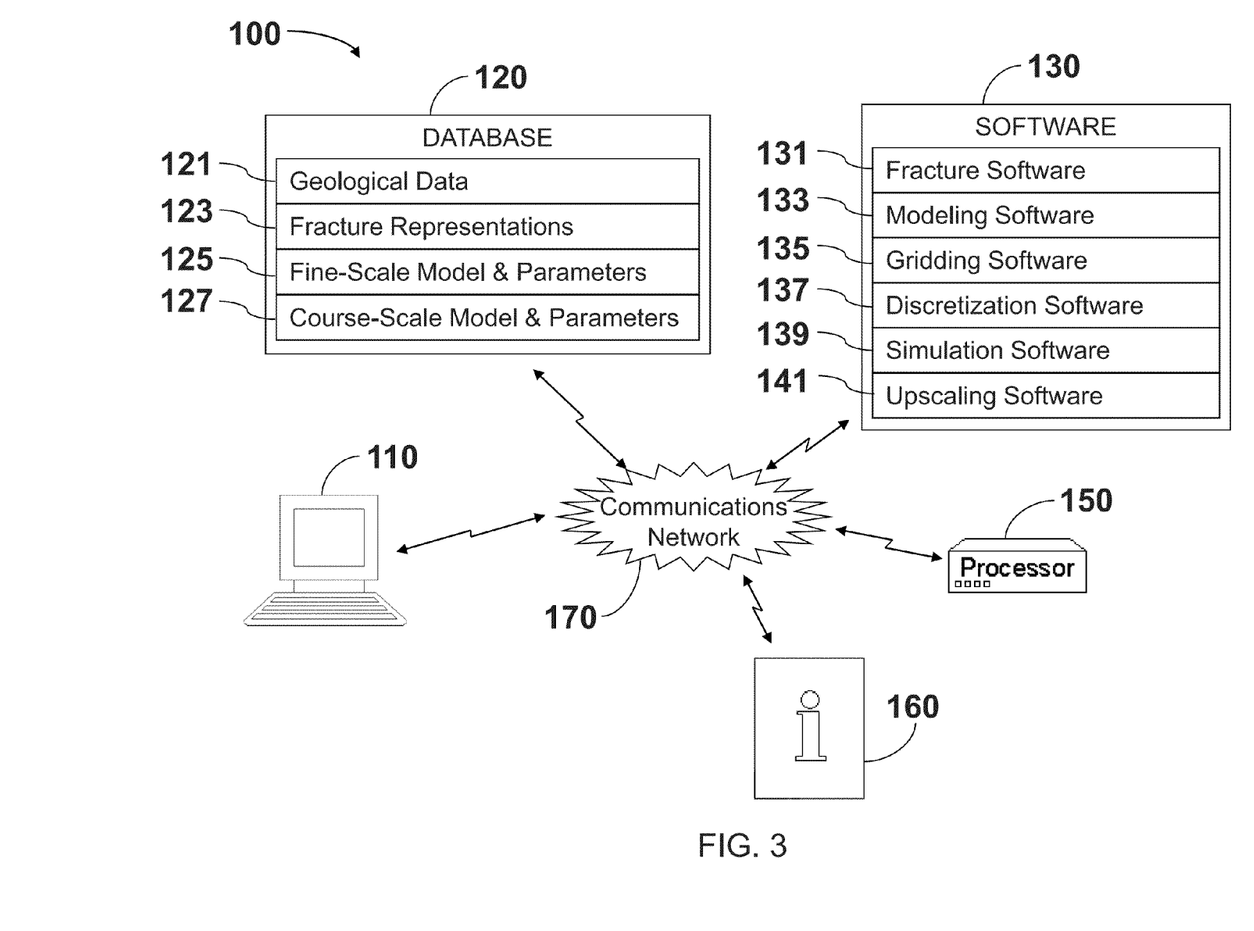
FIG. 3 is a schematic diagram of a system and method for predicting fluid flow characteristics within fractured subsurface reservoirs, in accordance with the present invention.

FIG. 3 illustrates a system 100 by which hydrocarbon production forecasts for a fractured subsurface reservoir are made according to aspects of the present invention. System 100 includes user interface 110, such that an operator can actively input information and review operations of system 100. User interface 110 can be any means in which a person is capable of interacting with system 100 such as a keyboard, mouse, touch-screen display, or a handheld graphic user interface (GUI) including a personal digital assistant (PDA). Input that is entered into system 100 through user interface 110 can be stored in a database 120. Additionally, any information generated by system 100 can also be stored in database 120. For example, database 120 can store geological data 121, as well as, system generated information such as fracture representations 123. Accordingly, fine-scale models and parameters 125, as well as, coarse-scale models and parameters 127 are also examples of information that can be stored in database 120.

System 100 includes software 130 to perform a plurality of operations. For example, fracture software 131 is capable of generating a fracture representation describing a network of fractures within a subsurface reservoir. Similarly, modeling software 133 is capable of generating a geological model representative of a subsurface reservoir. Typically modeling software 133 constructs fine-scale geological models of a fractured subsurface reservoir in the form of discrete fracture models. Gridding software 135 is capable of decomposing a reservoir model into a plurality of cells. Software 130 also includes discretization software 137, which is capable of transforming the geological reservoir model into discrete difference equations suitable for numerical computing. Simulation software 139 is capable of computing the discrete difference equations, thus simulating fluid flow characteristics in the reservoir, regardless of scale (i.e., fine-scale models or coarse-scale models). Although not required, upscaling software 141 is also provided and is capable of coarsening the fine-scale resolution of a fine-scale model to allow for computational tractability. Processor 150 interprets instructions to execute software 130, as well as, generating automatic instructions to execute software 130 responsive to predetermined conditions. Instructions from both user interface 110 and software 130 are processed by processor 150 for operation of system 100.

In certain embodiments, system 100 can include reporting unit 160 to provide information to the operator or to other systems (not shown). For example, reporting unit 160 can be a printer, display screen, or a data storage device. However, it should be understood that system 100 need not include reporting unit 160, and alternatively user interface 110 can be utilized for reporting any information of system 100 to the operator. For example, the output can be visually displayed to the user using a monitor or user interface device such as a handheld graphic user interface (GUI) including a personal digital assistant (PDA).

Communication between any components of system 100, such as user interface 110, database 120, software 130, processor 150 and reporting unit 160, can be transferred over communications network 170. Communications network 170 can be any means that allows for information transfer. Examples of such a communications network 170 presently include, but are not limited to, a switch within a computer, a personal area network (PAN), a local area network (LAN), a wide area network (WAN), and a global area network (GAN). Communications network 170 can also include any hardware technology used to connect the individual devices in the network, such as an optical cable or wireless radio frequency.

In operation, an operator inputs data, such as geological data 121 that describes a subsurface reservoir having a network of fractures, through user interface 110 into database 120. Fracture software 131 is initiated to generate a stochastic fracture representation 123 that explicitly represents the network of fractures within the subterranean reservoir. Modeling software uses the geological data 121 and the fracture representation 123 to construct a geological model representative of the subsurface reservoir, such as a fine-scale discrete fracture model. Gridding software 135 decomposes the fine-scale geological model with a fine-scale grid. The fine-scale grid defines a plurality of fine-scale cells such that the network of fractures is represented by interfaces between the fine-scale cells. Discretization software 137 discretizes the fine-scale grid to compute fine-scale simulation parameters for the fine-scale cells suitable for numerical computing. Simulation software 139 performs simulation using the fine-scale simulation parameters to predict fluid flow characteristics for the fractured subsurface reservoir.

One skilled in the art will appreciate that simulation software 139 is able to simulate fluid flow characteristics of a reservoir simulation model, regardless of scale (i.e., fine-scale models or coarse-scale models). Accordingly, in some operations, upscaling software 141 generates a coarse-scale grid defining a plurality of coarse-scale cells, and performs upscaling for the coarse-scale grid to compute coarse-scale simulation parameters for the coarse-scale cells. The coarse-scale simulation parameters are based on the fine-scale simulation parameters for the fine-scale cells. Simulation software 139 performs simulation using the coarse-scale simulation parameters to predict fluid flow characteristics for the fractured subsurface reservoir.

A prediction of fluid flow characteristics within the subsurface reservoir is made responsive to the simulation of the reservoir model. The forecast can be output to the operator with reporting unit 160 or can be provided through user interface 110.

EXAMPLES

Figure 4:
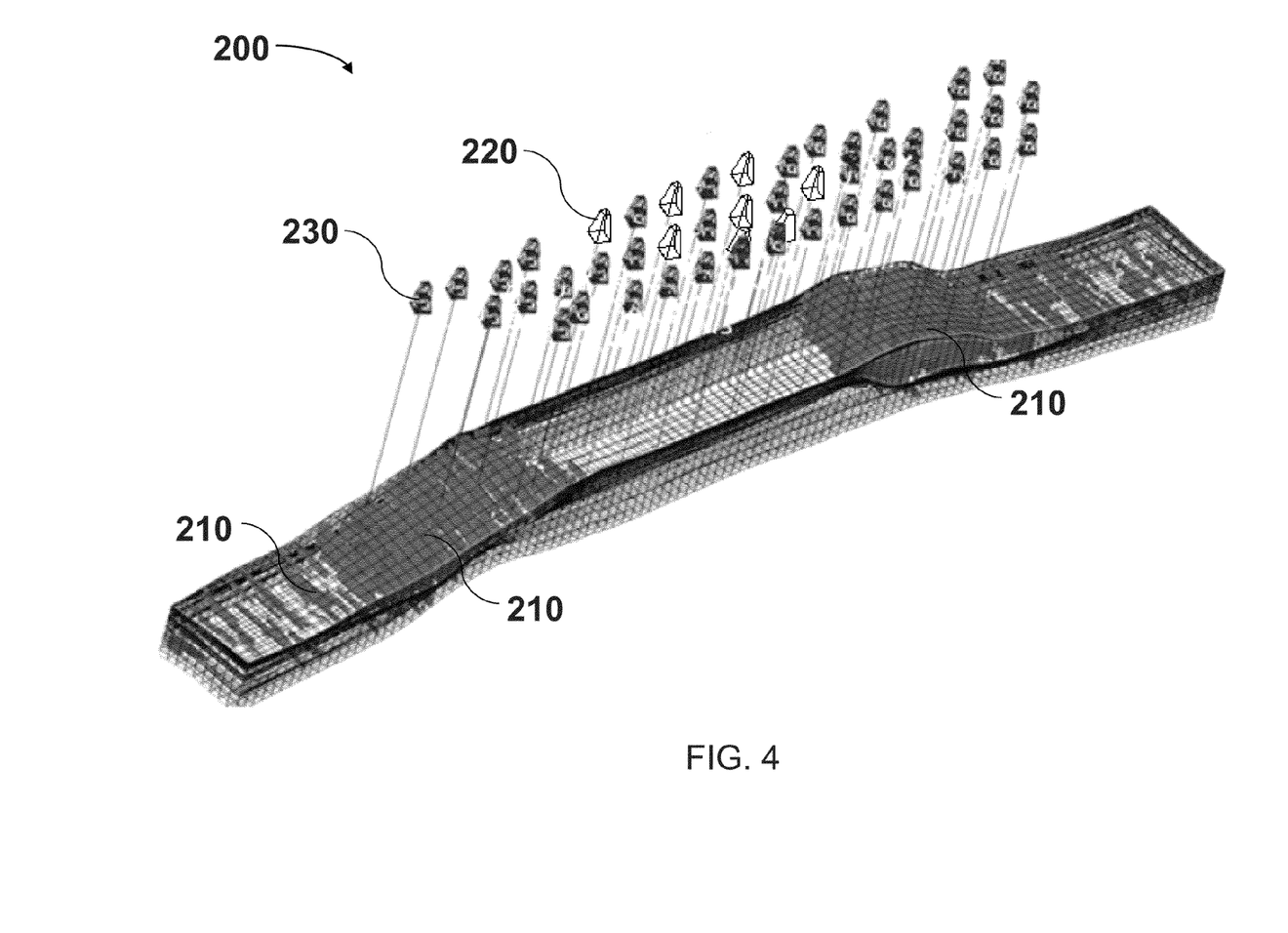
FIG. 4 is a schematic view of a discrete fracture model, in accordance with the present invention.

Referring to FIG. 4, the system and method as described in FIG. 1 is applied to a giant carbonate reservoir to predict fluid flow characteristics. In particular, a sector encompassing a region of interest, which is approximately 17 mi×1.4 mi×1.1 mi in physical dimension and represents about $\frac{1}{15}_{th}$ of the full-field model, is investigated. As in Step 11 of Method 10, geological data describing the sector is provided. Using the fracture characterization procedure, a network of hundreds of discrete fractures is stochastically generated, similar to that which is performed in Step 13 of Method 10. A realistic discrete fracture model 200 is constructed to represent the carbonate reservoir. The realistic discrete fracture model 200 is an example of a fine-scale geological model of the subsurface reservoir that is constructed in Step 15 of Method 10. The model contains 1230 discrete fractures, represented by reference character 210, and 47 current or future planned wells (8 fluid injection wells 220 and 39 producing wells 230). Decomposition of the fine-scale geological model, as detailed in Step 17 of Method 10, is applied to generate a high-quality grid defining a plurality of fine-scale cells.

Figure 5:
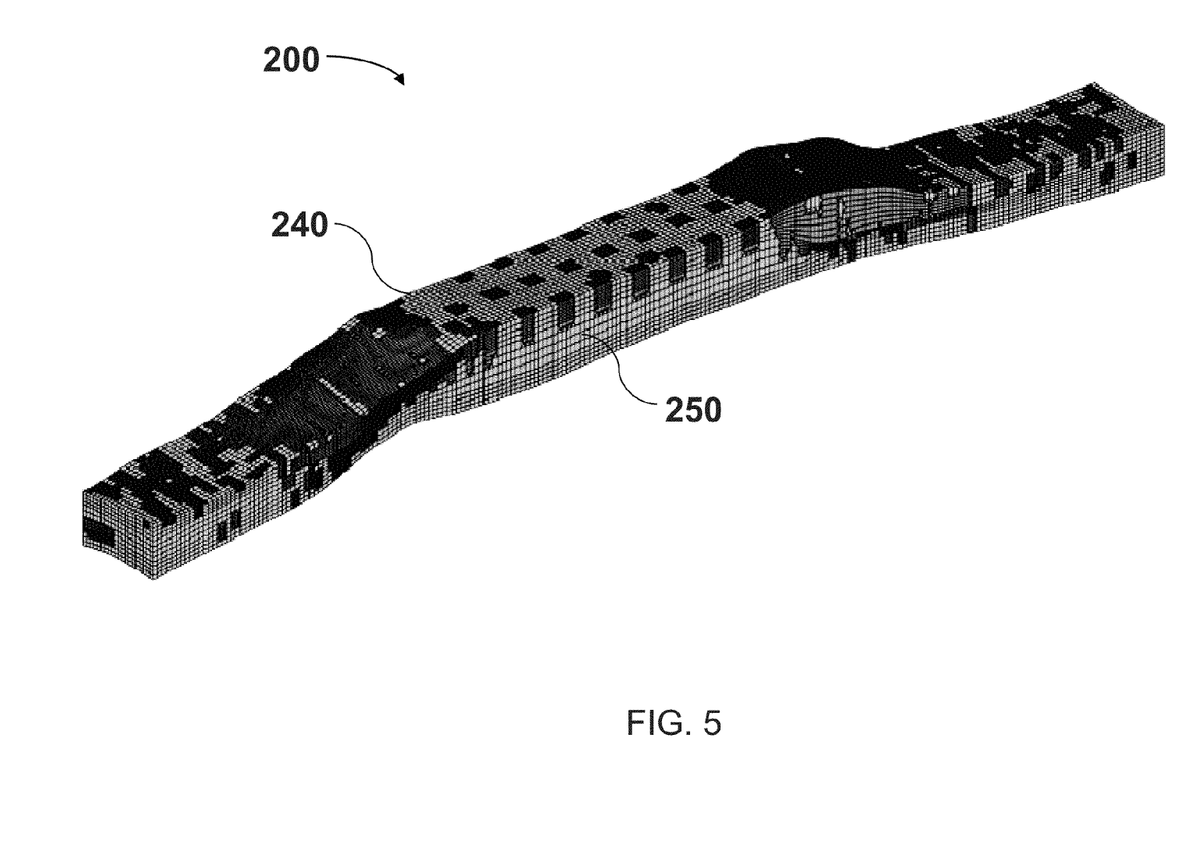
FIG. 5 is a schematic view of the discrete fracture model shown in FIG. 4 partitioned by a fine-scale grid, in accordance with the present invention.

FIG. 5 illustrates the generated fine-scale grid 240 having adaptive spatial resolution, such that cells are refined in the vicinity of the network of fractures 210 and the wells 220, 230. The grid 240 decomposes the model 200 into 197,802 nodes and 344,805 fine-scale cells 250 to capture the detail around the network of fractures 210 and the wells 220, 230. In particular, 305,751 matrix and 39,054 fracture control volumes define 893,987 flow connections.

Figure 6A:
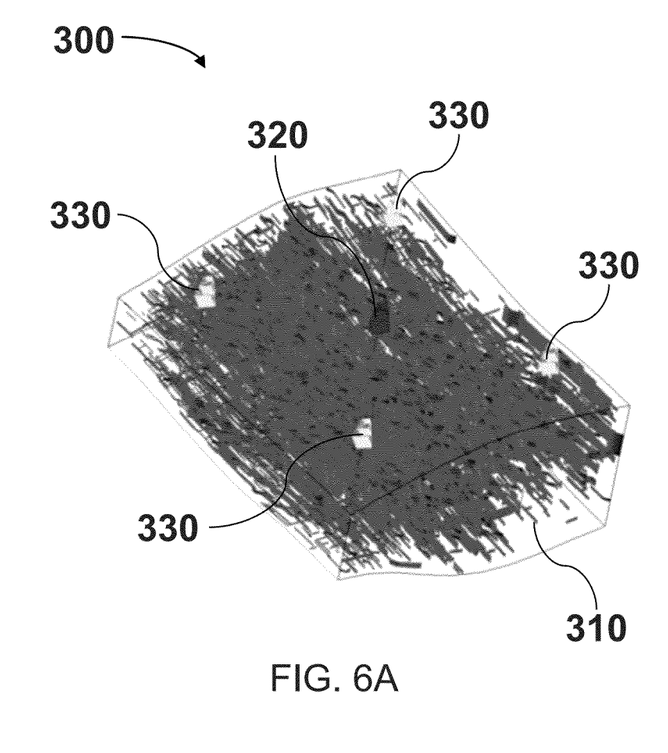
FIGS. 6A and 6B are schematic views of a sector model of the discrete fracture model shown in FIG. 4, in accordance with the present invention.
Figure 6B:
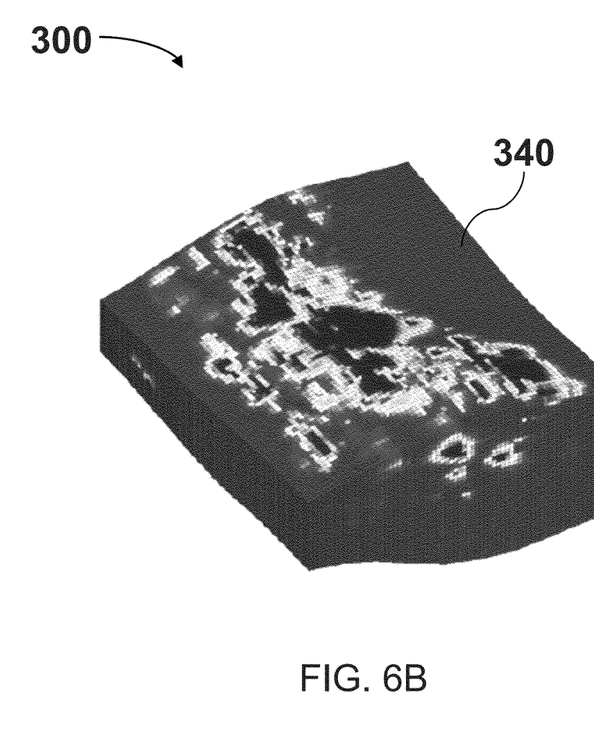
Figure 7:
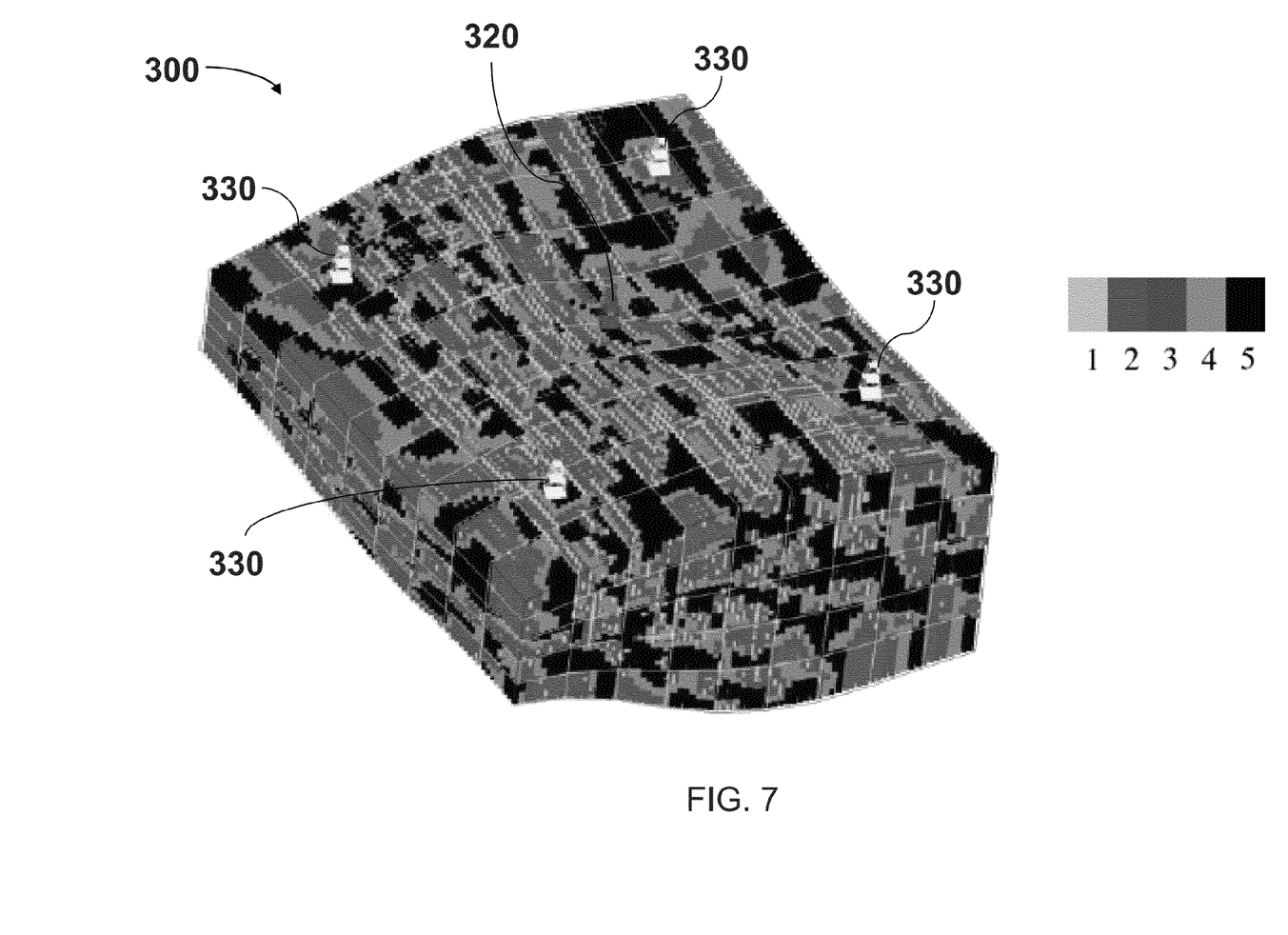
FIG. 7 is a schematic view of the sector model shown in FIG. 6 illustrating multiple sub-regions within the coarse-scale cells, in accordance with the present invention.

Referring to FIGS. 6 and 7, a smaller sector 300, is extracted from the sector shown in FIGS. 4 and 5. Simulation is performed on sector 300 assuming less complex production conditions. Sector 300 encompasses a volume approximately 1.4 mi by 1.4 mi by 0.5 mi in size. FIG. 6A shows that this section includes approximately 8000 fractures 310 of wide-ranging length scales and 5 wells are considered. A fluid injector well 320 is completed in the center of the sector while a producer well 330 is placed at each of the four corners. Application of the gridding technique, as detailed in Step 17 of Method 10, yields a discrete fracture model with 277,023 fine-scale cells 340. A target fluid injection rate, $q_{s,inj}$, is specified subject to some maximum bottom hole pressure (BHP) and the producers are set to produce at a target production flow rate, $q_o$, subject to some minimum bottom hole pressure for a total simulation period of 42 years. First-contact miscibility, gravity, and capillarity are all accounted for in simulations, however, the pressure is not depleted below the bubble point and thus, there is no free gas in the system at any time. Using 4 central processing units (CPUs) in parallel, the fine-scale discrete fracture model simulation took approximately 83 CPU hours to complete. The discrete fracture model with a late-time oil saturation map for a miscible gas injection problem is shown in FIG. 6B. The late-time oil saturation map for the discrete fracture model shows the high degree of heterogeneous flow behavior observed in the fine-scale simulation.

FIG. 7 shows a target multiple sub-region upscaling coarse-scale grid with the sub-regions each being shaded differently. The coarse-scale grid is comprised of 9×9×5 coarse-scale cells, with five subregions within each coarse cell to better capture any pressure and saturation gradation that occurs inside the matrix portion of these coarse cells. By applying the multiple sub-region upscaling procedure on the discrete fracture model, an upscaled model with 2,025 control volumes (sum of all subregions in all coarse cells) is obtained.

Figure 8:
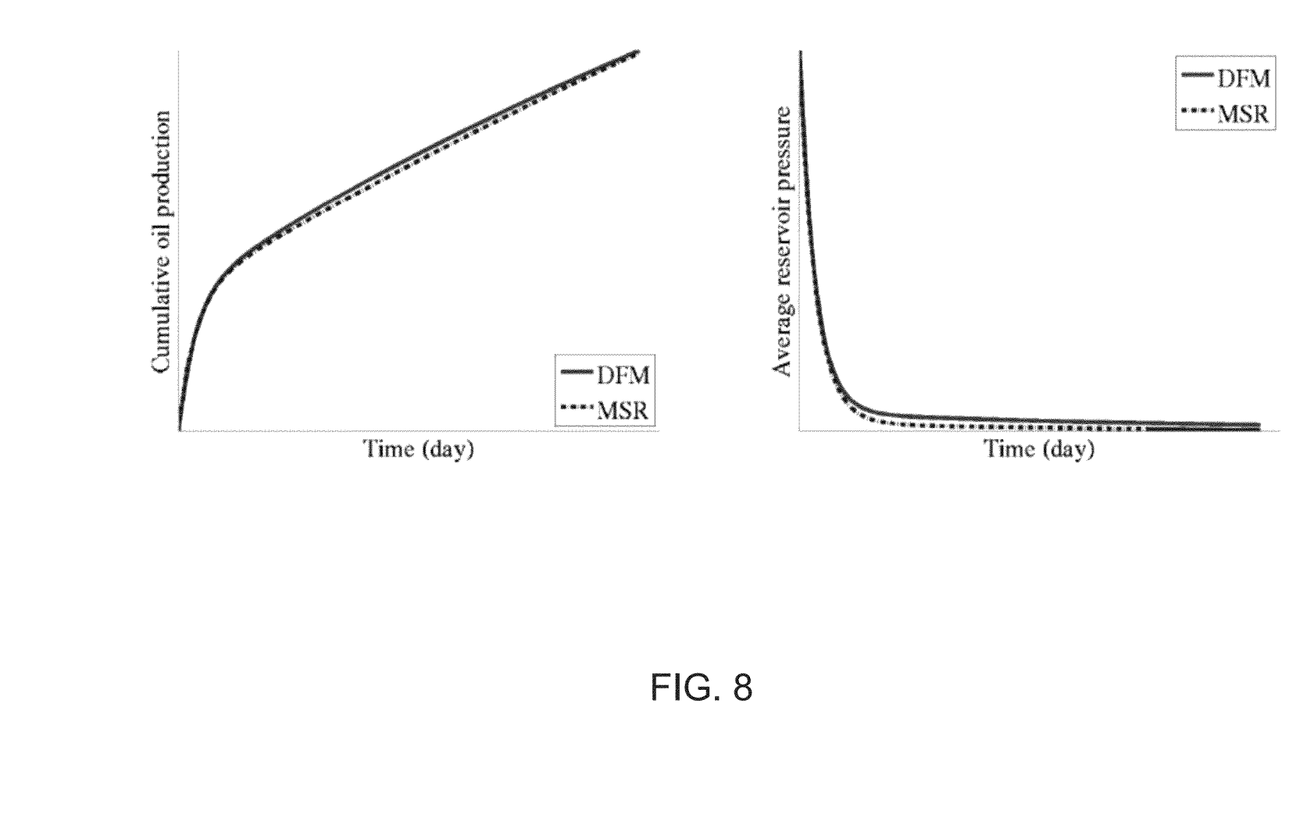
FIG. 8 is a graph comparing the simulation of the upscaled sector model shown in FIG. 7 to the simulation of a fine-scale sector model shown in FIG. 6B, in accordance with the present invention.

FIG. 8 shows that the multiple sub-region model yields cumulative oil production and average reservoir pressure curves that very accurately match those given by the fine-scale discrete fracture model. Other flow variables such as cumulative gas production are also closely reproduced (not shown).

Figure 9A:
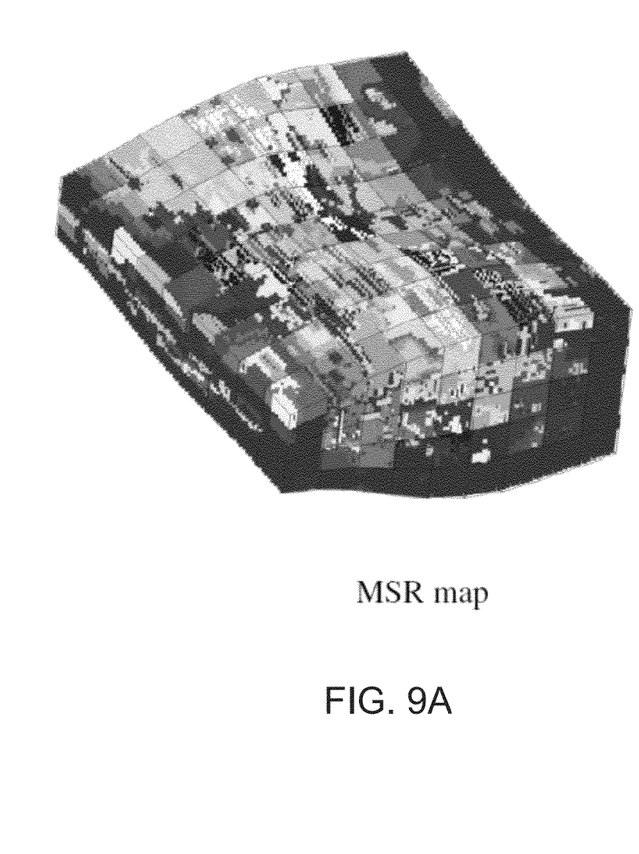
FIGS. 9A and 9B are schematic views comparing the upscaled sector model shown in FIG. 7 to one averaged from the discrete fracture model shown in FIG. 6A.
Figure 9B:
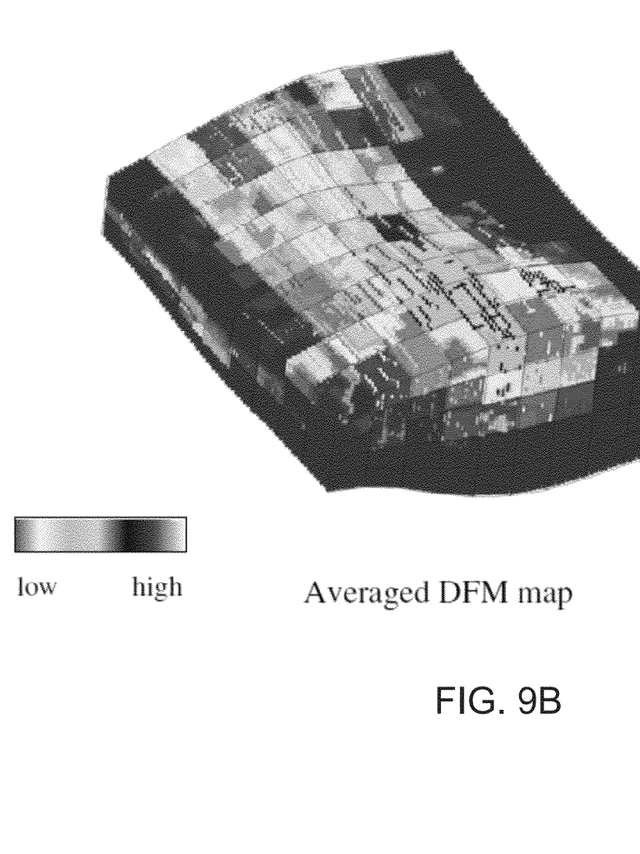

FIG. 9 depicts upscaling accuracy by illustrating 3D spatial distribution of variables. As can be seen in FIG. 9, there exists some inaccuracy in the fluid saturation map from the multiple sub-region model (FIG. 9A) when compared with that obtained by averaging the fine-scale values of the discrete fracture model onto the multiple sub-region grid (FIG. 9B). The averaging uses a pore-volume weighting scheme appropriate for saturations and is done for better comparability of the discrete fracture model and multiple sub-region spatial results. The use of global information, near-well upscaling, and boundary conditions that take into account gravitational effects, can possibly further improve the accuracy of the coarse-scale results. The coarse multiple sub-region upscaled model required only 0.4 hours to complete (including simulation and upscaling times). Therefore, through application of multiple sub-region upscaling a substantial speedup factor of over 200 was obtained while still producing flow results with reasonable accuracy.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A computer-implemented method to predict fluid flow characteristics within a fractured subsurface reservoir, the method comprising:
   providing geological data describing a subsurface reservoir having a network of fractures and a rock matrix;
   generating a stochastic fracture representation that represents the network of fractures;
   constructing a fine-scale geological model of the subsurface reservoir using the geological data;
   constructing a fine-scale grid associated with the fine-scale geological model and the stochastic fracture representation, the fine-scale grid being constructed by:
      constructing a uniform, structured lattice comprising a plurality of polyhedral cells representing the rock matrix, the polyhedral cells having cell-to-cell interfaces in between the polyhedral cells;
      refining a portion of the polyhedral cells representing the rock matrix of the uniform, structured lattice, wherein the polyhedral cells being refined are in vicinity of the network of fractures, and wherein refining occurs after constructing;
      selecting, for each of the fractures, a plurality of the cell-to-cell interfaces in between the polyhedral cells representing the rock matrix and that are adjacent to the fracture to form a continuous interfaces path approximating a geometry of the fracture, wherein selecting occurs after refining; and
      associating each of the continuous interfaces paths formed with predetermined fracture properties, wherein associating occurs after selecting;
      wherein the fine-scale grid that is constructed comprises each of the continuous interfaces paths associated with the predetermined fracture properties; and
   discretizing the fine-scale grid to compute fine-scale simulation parameters; and
   simulating the fine-scale simulation parameters to predict fluid flow characteristics within the subsurface reservoir.

2. The method of claim 1, wherein:
   the fine-scale grid includes fracture-fracture, fracture-matrix, and matrix-matrix connections.

3. The method of claim 1, wherein:
   the fine-scale geological model includes a well; and
   a plurality of the cell-to-cell interfaces adjacent to the well form an interfaces well region approximating a geometry of the well and define well connections within the fine-scale grid.

4. The method of claim 1, wherein:
   the geological data is characterized by one or more items selected from a group consisting of seismic images, cores, production logs, down-hole well measurements, drilling information, and outcrops.

5. The method of claim 1, wherein:
   the fine-scale grid is generated using adaptive grid refinement.

6. The method of claim 1, wherein:
   the fine-scale simulation parameters are computed using a finite-volume discretization.

7. The method of claim 1, wherein:
   the fine-scale simulation parameters are characterized by one or more items selected from a group consisting of cell volume, cell permeability, cell porosity, and cell-to-cell interactions.

8. The method of claim 7, wherein:
   the cell-to-cell interactions are determined by computing transmissibilities for the fracture connections for the polyhedral cells within the fine-scale grid.

9. The method of claim 1, wherein:
   the fluid flow characteristics are characterized by one or more items selected from a group consisting of pressure distributions, saturation distributions, production rates, and ultimate hydrocarbon recovery.

10. The method of claim 1, wherein:
    the simulating the fine-scale simulation parameters comprises simulating the fine-scale simulation parameters on the fine-scale grid.

11. The method of claim 1, wherein:
    the simulating the fine-scale simulation parameters comprises:
       generating a coarse-scale grid defining a plurality of coarse-scale cells;
       performing upscaling for the coarse-scale grid to compute coarse-scale simulation parameters for the coarse-scale cells based on the fine-scale simulation parameters; and
       simulating the coarse-scale simulation parameters on the coarse-scale grid.

12. The method of claim 11, wherein:
    performing upscaling comprises performing multiple sub-region upscaling, such that the coarse-scale grid is decomposed into a plurality of sub-regions to account for spatial variability of the fine-scale simulation parameters.

13. The method of claim 11, wherein:
    performing upscaling comprises:
       defining pressure contours within the coarse-scale grid based on the fine-scale simulation parameters;
       decomposing the coarse-scale grid into sub-regions based on the pressure contours;
       computing parameters within the sub-regions;
       computing transmissibilities between the sub-regions within the coarse-scale cells; and
       computing transmissibilities between the coarse-scale cells.

14. The method of claim 13, wherein:
    the parameters within the sub-regions are characterized by one or more items selected from a group consisting of sub-region bulk volume, porosity, pressure and sub-region-to-sub-region connections.

15. The method of claim 14, wherein:
    the sub-region-to-sub-region connections include fracture-fracture connections, matrix-fracture connections, and matrix-matrix connections.

16. A computer-implemented method to predict fluid flow characteristics within a fractured subsurface reservoir, the method comprising:
    providing geological data describing a subsurface reservoir having a network of fractures and a rock matrix;
    generating a stochastic fracture representation that represents the network of fractures;
    constructing a geological model of the subsurface reservoir using the geological data;
    constructing an output grid associated with the geological model and the stochastic fracture representation, the output grid being constructed by:

constructing a uniform, structured lattice comprising a plurality of polyhedral cells representing a rock matrix, the polyhedral cells having cell-to-cell interfaces in between the polyhedral cells;

refining a portion of the polyhedral cells representing the rock matrix of the uniform, structured lattice, wherein the polyhedral cells being refined are in vicinity of the network of fractures, and wherein refining occurs after constructing;

selecting, for each of the fractures, a plurality of the cell-to-cell interfaces in between the polyhedral cells representing the rock matrix and that are adjacent to the fracture to form a continuous interfaces path approximating a geometry of the fracture, wherein selecting occurs after refining; and associating each of the continuous interfaces paths formed with predetermined fracture properties, wherein associating occurs after selecting;

wherein the output grid that is constructed comprises each of the continuous interfaces paths associated with the predetermined fracture properties; and discretizing the output grid to compute simulation parameters; and simulating the simulation parameters to predict fluid flow characteristics within the subsurface reservoir.

17. The method of claim 16, wherein:
the geological model includes a well;
and a plurality of the cell-to-cell interfaces adjacent to the well form an interfaces well region approximating a geometry of the well and define well connections within the output grid.

18. A system to predict fluid flow characteristics within a fractured subsurface reservoir, the system comprising:
a user control interface to input information into the system, the information including geological data describing a subsurface reservoir having a network of fractures;
a software package, the software package including:
a fracture software for generating a stochastic fracture representation that represents the network of fractures and a rock matrix;
a modeling software for producing a fine-scale geological model representative of the subsurface reservoir using the geological data;
a gridding software for constructing a fine-scale grid associated with the fine-scale geological model and the stochastic fracture representation, the fine-scale grid being constructed by:
constructing a uniform, structured lattice comprising a plurality of polyhedral cells representing a rock matrix, the polyhedral calls having cell-to-cell interfaces in between the polyhedral cells;
refining a portion of the polyhedral cells representing the rock matrix of the uniform, structured lattice, wherein the polyhedral cells being refined are in vicinity of the network of fractures, and wherein refining occurs after constructing;
selecting, for each of the fractures, a plurality of the cell-to-cell interfaces in between the polyhedral cells representing the rock matrix and that are adjacent to the fracture to form a continuous interfaces path approximating a geometry of the fracture, wherein selecting occurs after refining; and
associating each of the continuous interfaces paths formed with predetermined fracture properties, wherein associating occurs after selecting; and wherein the fine-scale grid that is constructed comprises each of the continuous interfaces paths associated with the predetermined fracture properties; and a discretization software for discretizing the fine-scale grid to compute fine-scale simulation parameters; and a simulation software for simulating the fine-scale simulation parameters to predict fluid flow characteristics within the subsurface reservoir;

a database to store the geological data, the stochastic fracture representation, the fine-scale geological model, the fine-scale simulation parameters, and the fluid flow characteristics within the subsurface reservoir; and means in communication with the software package to output the fluid flow characteristics predicted from the simulation software.

19. The system of claim 18, wherein:
the software package further includes an upscaling software for generating a coarse-scale grid defining a plurality of coarse-scale cells and for performing upscaling for the coarse-scale grid to compute coarse-scale simulation parameters based on the fine-scale simulation parameters.

20. The method of claim 1, wherein the polyhedral cells of the uniform, structured lattice are tetrahedra.

21. The method of claim 1, wherein the polyhedral cells of the uniform, structured lattice are triangular.

22. The method of claim 16, wherein the polyhedral cells of the uniform, structured lattice are tetrahedra.

23. The method of claim 16, wherein the polyhedral cells of the uniform, structured lattice are triangular.

24. The system of claim 18, wherein the polyhedral cells of the uniform, structured lattice are tetrahedra.

25. The system of claim 18, wherein the polyhedral cells of the uniform, structured lattice are triangular.

26. The method of claim 1, wherein:
the refining the portion of the polyhedral cells representing the rock matrix of the constructed uniform, structured lattice is based on a proximity function, the proximity function determining a distance between each of the polyhedral cells and the fracture in vicinity of each of the polyhedral cells.

27. The method of claim 16, wherein:
the refining the portion of the polyhedral cells representing the rock matrix of the constructed uniform, structured lattice is based on a proximity function, the proximity function determining a distance between each of the polyhedral cells and the fracture in vicinity of each of the polyhedral cells.

28. The system of claim 18, wherein:
the refining the portion of the polyhedral cells representing the rock matrix of the constructed uniform, structured lattice is based on a proximity function, the proximity function determining a distance between each of the polyhedral cells and the fracture in vicinity of each of the polyhedral cells.

29. The method of claim 1, wherein:
the simulating the fine-scale simulation parameters comprises simulating the fine-scale simulation parameters to predict the fluid flow characteristics for multiple phases.

30. The method of claim 16, wherein:
the simulating the fine-scale simulation parameters comprises simulating the fine-scale simulation parameters to predict the fluid flow characteristics for multiple phases.

31. The system of claim 18, wherein:
the simulating the fine-scale simulation parameters comprises simulating the fine-scale simulation parameters to predict the fluid flow characteristics for multiple phases.

\* \* \* \* \*